(12) United States Patent
Zhou

(10) Patent No.: US 12,253,769 B2
(45) Date of Patent: Mar. 18, 2025

(54) MICRO-NANO DEVICE, MANUFACTURING METHOD, AND DISPLAY DEVICE

(71) Applicants: Beijing BOE Technology Development Co., Ltd., Beijing (CN); BOE Technology Group Co., Ltd., Beijing (CN)

(72) Inventor: Jian Zhou, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/026,516

(22) PCT Filed: Jun. 24, 2022

(86) PCT No.: PCT/CN2022/101244
§ 371 (c)(1),
(2) Date: Mar. 15, 2023

(87) PCT Pub. No.: WO2023/245653
PCT Pub. Date: Dec. 28, 2023

(65) Prior Publication Data
US 2024/0295781 A1    Sep. 5, 2024

(51) Int. Cl.
G02F 1/135     (2006.01)
G02F 1/1343    (2006.01)

(52) U.S. Cl.
CPC ...... *G02F 1/1351* (2021.01); *G02F 1/134309* (2013.01); *G02F 1/13439* (2013.01)

(58) Field of Classification Search
None
See application file for complete search history.

(56) References Cited

U.S. PATENT DOCUMENTS

| | | | |
|---|---|---|---|
| 11,860,458 B2* | 1/2024 | Panuski | G02F 1/025 |
| 11,885,887 B1* | 1/2024 | Mazed | G01S 17/89 |
| 2017/0023803 A1 | 1/2017 | Han et al. | |
| 2020/0111259 A1* | 4/2020 | Sears | G02B 27/0172 |
| 2022/0416214 A1 | 12/2022 | Wei et al. | |
| 2023/0140663 A1* | 5/2023 | Wang | H10K 50/844 257/40 |

FOREIGN PATENT DOCUMENTS

| | | |
|---|---|---|
| CN | 107505738 A | 12/2017 |
| CN | 112038369 A | 12/2020 |
| CN | 113078184 A | 7/2021 |
| CN | 114447608 A | 5/2022 |
| CN | 114551763 A | 5/2022 |
| JP | 2000098323 A | 4/2000 |

* cited by examiner

*Primary Examiner* — Ryan Crockett
(74) *Attorney, Agent, or Firm* — IPro, PLLC

(57) ABSTRACT

The present disclosure relates to the field of micro-nano devices, and discloses a micro-nano device, a manufacturing method, and a display device. The micro-nano device includes a micro-nano structural cell; wherein the micro-nano structural cell includes a substrate provided with a light incident surface and a light emergent surface which are oppositely disposed; a first electrode layer, a second electrode layer, a tunable dielectric layer and an absorbing layer.

17 Claims, 9 Drawing Sheets

MICRO-NANO DEVICE, MANUFACTURING METHOD, AND DISPLAY DEVICE

The present application is a National Stage of International Application No. PCT/CN2022/101244, filed on Jun. 24, 2022, which is hereby incorporated by reference in its entirety.

FIELD

The present disclosure relates to the technical field of micro-nano devices, and in particular to a micro-nano device, a manufacturing method, and a display device.

BACKGROUND

Beam steering has been widely used in a radar technology, while the recently emerging light detection and ranging-finding technology has been widely developed on the basis of the previous radar technology. The traditional Lidar technology utilizes a laser source to illuminate a target object, and detects the return time (time of flight) of the reflected light pulse beam to calculate the distance of the object. This technology has been applied to the ground, aircraft, space and other devices to sense the surrounding environment. At first, the ground Lidar technology is only used for simple measurement (a distance or vehicle speed), but now has been widely used in various advanced devices, such as automatic driving and artificial intelligence robots.

Currently, several Lidar systems have been optimized to meet the requirements of various applications. For example, for consumer electronics, the cost and size of equipment are very important, but the measurement accuracy, measurable range distance, and stability of the system are also critical for precision equipment. Given the potential of the use of Lidar based on the real world and potential economic impact, even in the short term, research and development in hardware and software will grow rapidly.

For some special applications, the decision time of the Lidar system will need to be fast enough for automatic vehicles to guarantee safe stops in dangerous situations. In particular, the safe measuring distance, high accuracy, and 360° real-time working range must be met for human safety. An optical system can overcome the bad weather environment and ensure stable work under different sunlight conditions. Based on the above requirements, it is desirable that the Lidar system can be manufactured as a compact and affordable chip-level sensor. However, at present, no commercial Lidar system can meet the above requirements. Most commercially available Lidar systems are mainly based on Micro-Electro-Mechanical Systems (MEMS), which are large in size and easily affected by the external environment.

SUMMARY

The present disclosure discloses a micro-nano device, a manufacturing method, and a display device. Dynamic control of beam pointing is achieved by modulation of a transmittance of different pixel units, and high imaging quality can be achieved.

To achieve the above objective, the present disclosure provides the following technical solutions.

In a first aspect, the present disclosure provides a micro-nano device, including: a micro-nano structural cell; wherein the micro-nano structural cell includes: a substrate provided with a light incident surface and a light emergent surface which are oppositely disposed; a first electrode layer located on a side of the light emergent surface of the substrate, the first electrode layer including a plurality of first electrodes; a second electrode layer located on a side, facing away from the substrate, of the first electrode layer, wherein the second electrode layer includes a plurality of second electrodes disposed in one-to-one correspondence with the plurality of the first electrodes, and the plurality of the first electrodes and the plurality of the second electrodes correspondingly form a plurality of light control regions; a tunable dielectric layer located between the first electrode layer and the second electrode layer; wherein an absorption resonance frequency of the tunable dielectric layer is changed under a drive of an electric field between the first electrodes and the second electrodes to change a transmission intensity of light in the micro-nano structural cell; and an absorbing layer located on a side, facing away from the tunable dielectric layer, of the second electrode layer; wherein the absorbing layer selectively absorbs light in different regions within the plurality of the light control regions to change a direction of light passing through the micro-nano structural cell.

The micro-nano device provided by the present disclosure includes the micro-nano structural cell including the substrate provided with the light incident surface and the light emergent surface which are oppositely disposed, and the first electrode layer, the tunable dielectric layer, the second electrode layer, and the absorbing layer are sequentially stacked on the side of the light emergent surface along the direction from the light incident surface of the substrate to the light emergent surface of the substrate. In particular, the first electrode layer is disposed on the side of the light emergent surface of the substrate, and the first electrode layer includes the plurality of the first electrodes, the second electrode layer includes the plurality of the second electrodes disposed in one-to-one correspondence with the plurality of the first electrodes, and the first electrodes and the second electrodes correspondingly form the plurality of the light control regions; the absorption resonance frequency of the tunable dielectric layer is changed under the drive of the electric field between the first electrodes and the second electrodes, thereby changing the transmission intensity of light when passing through the micro-nano structural cell; and the absorbing layer selectively absorbs light in different regions of the plurality of the light control regions, that is, in the plurality of the light control regions, due to the presence of the absorbing layer, light passes through some of the light control regions and light does not pass through some other of the light control regions, thereby changing the direction of the light passing through the micro-nano structural cell.

Optionally, the tunable dielectric layer includes a dielectric elastomer, and a thickness of the dielectric elastomer is changed by changing a voltage value between the first electrodes and the second electrodes.

Optionally, a material of the tunable dielectric layer is a phase change material, and a crystalline state of the phase change material is changed by changing a voltage value between the first electrodes and the second electrodes.

Optionally, a material of the tunable dielectric layer is a two-dimensional material, and a carrier concentration of the two-dimensional material is changed by changing a voltage value between the first electrodes and the second electrodes.

Optionally, a material of the tunable dielectric layer is a liquid crystal material, and a deflection direction of the liquid crystal material is changed by changing a voltage value between the first electrodes and the second electrodes.

Optionally, the first electrode layer and the second electrode layer are both made of indium tin oxide.

Optionally, the first electrode layer is a metal layer, and the second electrode layer is a metal layer; and the first electrodes are of a mesh structure and the second electrodes are of a mesh structure.

Optionally, a material of the absorbing layer is a metallic material.

Optionally, the metallic material is silver.

Optionally, the plurality of the first electrodes form a first electrode cell, and the plurality of the second electrodes form a second electrode cell; and the first electrode cell is arranged in a first direction, the second electrode cell is arranged in a second direction, and the first electrode cell is provided with an overlapping regions with the second electrode cell.

Optionally, the first electrode cell and the second electrode cell are orthogonal to each other.

In a second aspect, the present disclosure provides a manufacturing method for a micro-nano device, the micro-nano device including a micro-nano structural cell, wherein the method includes the steps of: providing a substrate provided with a light incident surface and a light emergent surface which are oppositely disposed; forming a first electrode layer on a side of the light emergent surface of the substrate, wherein the first electrode layer is patterned to form a plurality of first electrodes; forming a second electrode layer on a side, facing away from the substrate, of the first electrode layer, wherein the second electrode layer is patterned to form a plurality of second electrodes corresponding to the first electrodes, and the plurality of the first electrodes and the plurality of the second electrodes correspond to a plurality of light control regions; forming a tunable dielectric layer between the first electrode layer and the second electrode layer, wherein an absorption resonance frequency of the tunable dielectric layer is changed under a drive of an electric field between the first electrodes and the second electrodes to change a transmission intensity of light in the micro-nano structural cell; and forming an absorbing layer on the side, facing away from the tunable dielectric layer, of the second electrode layer, wherein the absorbing layer selectively absorbs light in different regions within the plurality of the light control regions to change the direction of light passing through the micro-nano structural cell.

In a third aspect, the present disclosure provides a display device, including a display panel, and any one of the micro-nano devices in the first aspect which is located on the side of a light emergent surface of the display panel.

Optionally, the display panel includes a plurality of pixel units, wherein the pixel units are in one-to-one correspondence with first electrodes in the micro-nano device; and the pixel units are in one-to-one correspondence with second electrodes in the micro-nano device.

REFERENCE SIGNS

Figure 1:
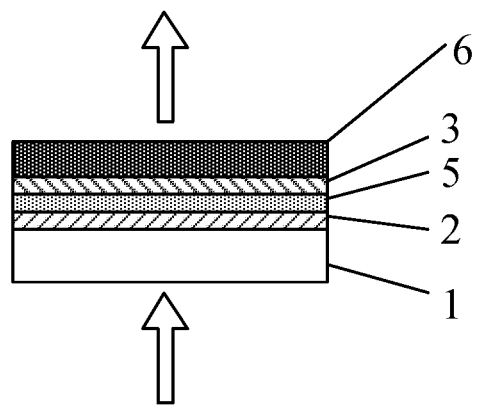
FIG. 1 is a schematic diagram of a micro-nano structural cell in a state 1 according to an embodiment of the present disclosure.

1—substrate; 2—first electrode layer; 21—first electrode cell; 3—second electrode layer; 31—second electrode cell; 5—tunable dielectric layer; 6—absorbing layer; and S—light control region.

DETAILED DESCRIPTION OF THE EMBODIMENTS

The technical solutions in the embodiments of the present disclosure will be described clearly and completely below with reference to the drawings in the embodiments of the present disclosure. Obviously, the described embodiments are only part of the embodiments of the present disclosure, but not all the embodiments. On the basis of the embodiments in the present disclosure, all other embodiments obtained by those of ordinary skill in the art without inventive efforts fall within the protection scope of the present disclosure.

An embodiment of the present disclosure provides a display device, including a display panel, and a micro-nano device located on a side of a light emergent surface of the display panel.

Specifically, the display panel includes a plurality of pixel units. For ease of understanding, each pixel unit may be one sub-pixel or a pixel unit formed by at least three sub-pixels of different colors.

The scale of the drawings in the present disclosure may be taken as a reference in the actual process, but is not limited thereto. For example, the thickness and spacing of film layers can be adjusted according to actual needs. The number of pixel units and the number of sub-pixels in each pixel unit in the display device are not limited to the number shown in the drawings, the drawings described in the present disclosure are structural schematic diagrams only, and one embodiment of the present disclosure is not limited to shapes, values, and the like shown in the drawings.

Ordinal numbers such as "first", "second", and the like in this specification are provided in order to avoid the confusion of components and are not intended to the components in terms of quantity.

Figure 2:
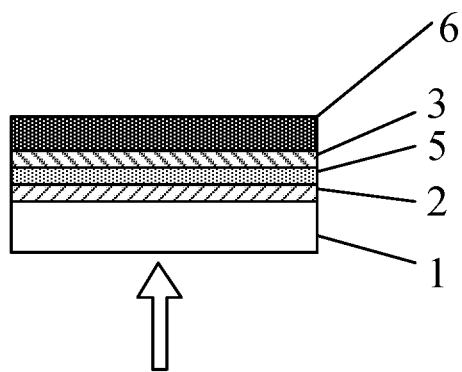
FIG. 2 is a schematic diagram of a micro-nano structural cell in a state 2 according to an embodiment of the present disclosure.

As shown in FIGS. 1 and 2, in a first aspect, an embodiment of the present disclosure provides a micro-nano device, including: a micro-nano structural cell; wherein the micro-nano structural cell includes: a substrate 1 provided with a light incident surface and a light emergent surface which are oppositely disposed; a first electrode layer 2 located on the side of the light emergent surface of the substrate 1, the first electrode layer 2 including a plurality of first electrodes; a second electrode layer 3 located on the side, facing away from the substrate 1, of the first electrode layer 2, wherein the second electrode layer 3 includes a plurality of second electrodes disposed in one-to-one correspondence with the plurality of the first electrodes, and the plurality of the first electrodes and the plurality of the second electrodes correspond to a plurality of light control regions S; the pixel units are located within the light control regions S, and the pixel units are in one-to-one correspondence with the first electrodes in the micro-nano device; and the pixel units are in one-to-one correspondence with the second electrodes in the micro-nano device; a tunable dielectric layer 5 located between the first electrode layer 2 and the second electrode layer 3; wherein an absorption resonance frequency of the tunable dielectric layer 5 is changed under the drive of an electric field between the first electrodes and the second electrodes to change a transmission intensity of light in the micro-nano structural cell; and an absorbing layer 6 located on the side, facing away from the tunable dielectric layer 5, of the second electrode layer 3; wherein the absorbing layer 6 selectively absorbs light in different regions within the plurality of the light control regions S to change the direction of light passing through the micro-nano structural cell.

It should be noted that the micro-nano device provided by the present disclosure includes the micro-nano structural cell including the substrate 1 provided with the light incident surface and the light emergent surface which are oppositely disposed, and the first electrode layer 2, the tunable dielectric layer 5, the second electrode layer 3, and the absorbing layer 6 are sequentially stacked on the side of the light emergent surface along the direction from the light incident surface of the substrate 1 to the light emergent surface of the substrate 1. In particular, the first electrode layer 2 is disposed on the side of the light emergent surface of the substrate, and the first electrode layer 2 includes the plurality of the first electrodes, the second electrode layer includes the plurality of the second electrodes disposed in one-to-one correspondence with the plurality of the first electrodes, and the first electrodes and the second electrodes correspondingly form the plurality of the light control regions S; the absorption resonance frequency of the tunable dielectric layer is changed under the drive of the electric field between the first electrodes and the second electrodes, thereby changing the transmission intensity of light when passing through the micro-nano structural cell; and the absorbing layer 6 selectively absorbs light in different regions of the plurality of the light control regions S, that is, in the plurality of the light control regions S, due to the presence of the absorbing layer 6, light passes through some of the light control regions S and light does not pass through some other of the light control regions S, thereby changing the direction of the light passing through the micro-nano structural cell.

In FIG. 1, which can be seen as a micro-nano structural cell corresponding to one light control region S, light is emitted from the pixel units, an arrow pointing towards the substrate 1 in FIG. 1 is incident light, i.e. a reference beam, and an arrow away from the substrate 1 in FIG. 1 is emergent light, i.e. a target beam. FIGS. 1 and 2 are schematic structural diagrams of two states of a light transmission micro-nano structural cell of a unit pixel. Two electrode layers are formed on the substrate 1 by patterning, and the tunable dielectric layer 5 is sandwiched between the electrode layers, the absorption resonance frequency of the tunable dielectric layer 5 can be changed by supplying power to the first electrode layer 2 and the second electrode layer 3, the uppermost absorbing layer 6 and the substrate 1 below forms an absorber, and the position of an absorption peak can be changed by adjusting the absorption resonance frequency of the tunable dielectric layer 5, thereby tuning a transmittance, i.e. an amplitude, a high transmission state is set as '1', and a high absorption state is set as '0', respectively, in FIG. 1, light is transmitted in a high transmission state, and in FIG. 2, light is absorbed in a high absorption state.

For convenience of understanding, a specific working principle of the micro-nano structural cell is explained as follows.

Figure 3:
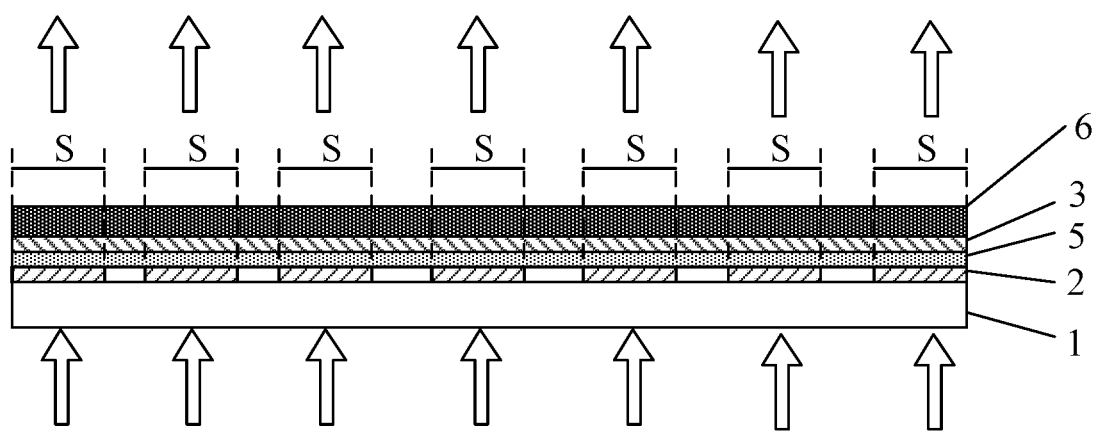
FIG. 3 is a side view of a one-dimensional beam of a micro-nano device according to an embodiment of the present disclosure.
Figure 4:
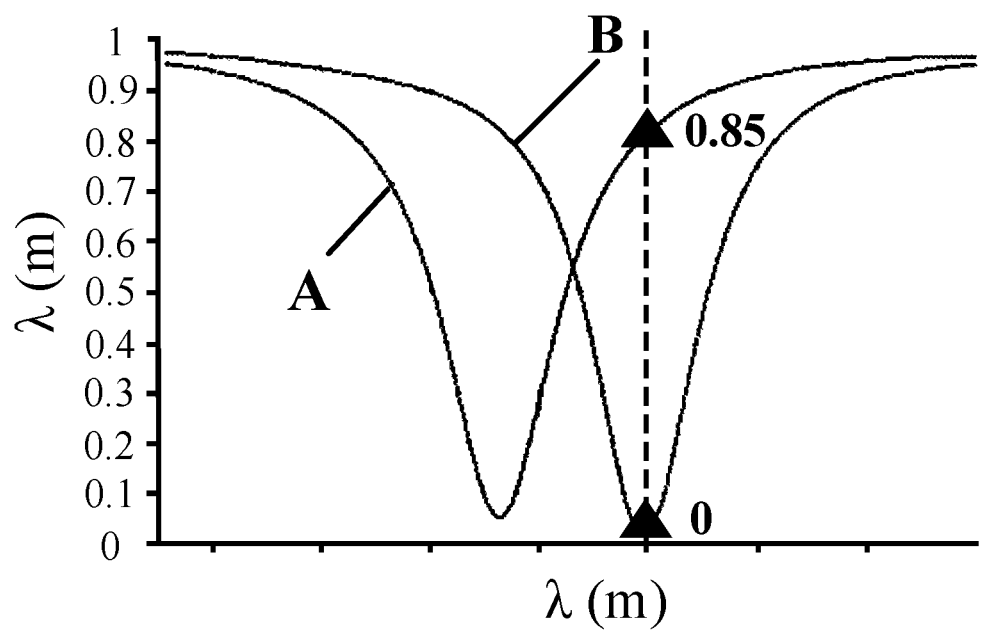
FIG. 4 is a schematic diagram of a transmittance change of the micro-nano structural cell according to the embodiment of the present disclosure.

As shown in FIGS. 3 and 4, for example, illustrated by a one-dimensional beam, the one-dimensional beam only needs to consider a pitch angle, i.e., θ in the following formula. A working principle of the micro-nano structural cell according to the embodiment of the present disclosure is shown by the following formula:

$$A_{ref} = e^{-ikz}$$

$$A_{obj} = e^{-ikx_i \sin\theta}$$

$$A = A_{obj} \cdot A^*_{ref,z=0} = A_{obj} = e^{-ikx_i \sin\theta}$$

$$\text{Sample} = \text{Re}(A) = \cos(kx_i \sin\theta).$$

Wherein $A_{ref}$ is a reference beam; $A_{obj}$ is a target beam; θ is a pitch angle of beam target pointing; z is a height of a z axis; xi is a position in the x-axis direction corresponding to each pixel unit, and i is a positive integer; k=2π/λ, k being a wave vector in the air; and sample is a sample function.

With continued reference to FIG. 3, arrows incident in the direction pointing towards the substrate 1 in FIG. 3 are reference beams, arrows away from the substrate 1 in FIG. 3 are target beams, the reference beams propagate along the z-axis in a free space, an angle of θ is assumed for the target beams, interference is performed based on the reference beams and the target beams at the surface location of the micro-nano structural cell provided by the embodiment of the present disclosure, amplitude sampling is performed on each pixel unit by an interference function, for example, sampling is performed on 100 pixel units to obtain a cosine function based on the corresponding position of each pixel unit, by the holographic amplitude modulation principle, it can be found that the amplitude of the entire interference front satisfies the cosine function by the following Sample formula, the target pointing angle is θ, sampling is performed on the above cosine function by a binary method, since the amplitude range of the sample formula function is between 0 and 1, it is assumed that a set threshold value is 0.5, and of course, the set threshold value of 0.5 is merely illustrative and the specific set threshold value can be selected according to actual needs. The following description is made with the set threshold value of 0.5, for example, when a transmittance of a location of a first pixel unit is less than 0.5, the location is '0' in the binary method, and if the transmittance of the location of the first pixel unit is greater than 0.5, the location is marked as '1'; similarly, if a transmittance of a location of a second pixel unit is less than 0.5, the location is '0' in the binary method, and if the transmittance of the location of the second pixel unit is greater than 0.5, the location is marked as '1'; and so on, if a transmittance of a location of a $100^{th}$ pixel unit is less than 0.5, the location is '0' in the binary method, and if the transmittance of the location of the $100^{th}$ pixel unit is greater than 0.5, the location is marked as '1'; and by performing continuous sampling of 0 and 1, a beam pointing angle of θ can be achieved. Here, the transmission intensity of different pixel unit locations is related to the absorption resonance frequency of the tunable dielectric layer 5 at the locations, i.e. the light control regions S, as shown in FIG. 4, i.e. when the electric field between the first electrodes and the second electrodes drives the absorption resonance frequency of the tunable dielectric layer 5 to change; with continued reference to FIG. 4, the abscissa is a wavelength, the ordinate is a transmittance, a curve A is a graph of a transmittance change of a reference beam at different wavelengths, a curve B is a graph of a transmittance change of a target beam at different wavelengths, the absorption resonance frequency of the tunable dielectric layer 5 corresponding to both the first electrodes and the second electrodes by supplying power to the first electrodes and the second electrodes, thereby achieving a shift of a resonance peak, the transmittance being changed from 0.85 to 0, and it is assumed that both states of 0.85 which is greater than 0.5, being '1' in the binary method, and 0 which is less than 0.5, being '0' in the binary method are set as '1' and '0', each compared with the set threshold value of 0.5.

Figure 5A:
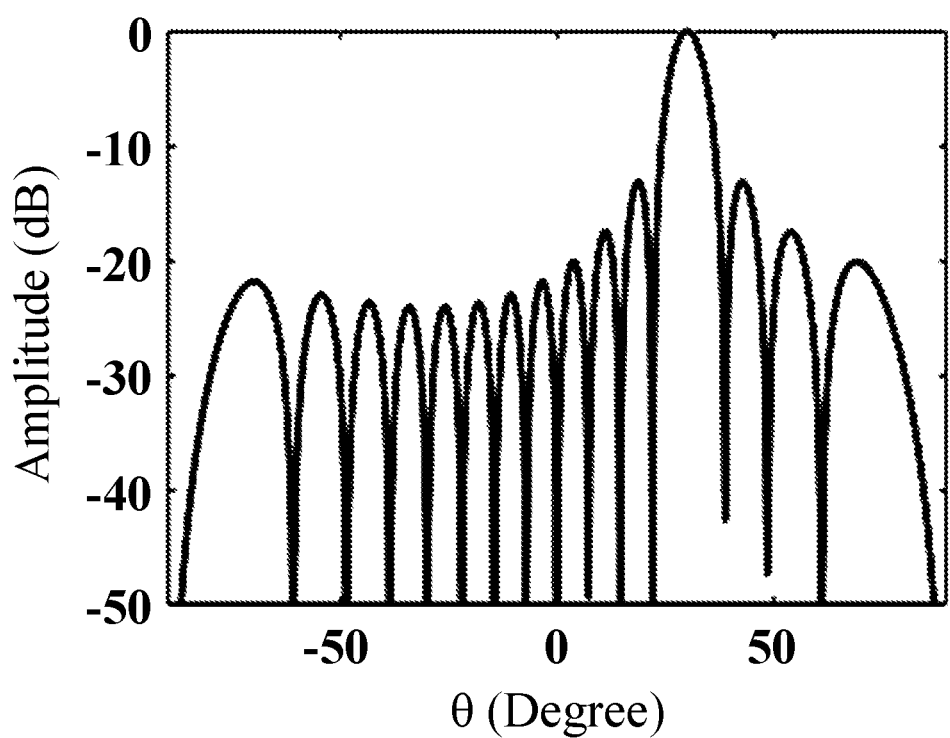
FIGS. 5A-5C are schematic diagrams of amplitude modulation of a one-dimensional holographic principle of the micro-nano device according to the embodiment of the present disclosure.
Figure 5B:
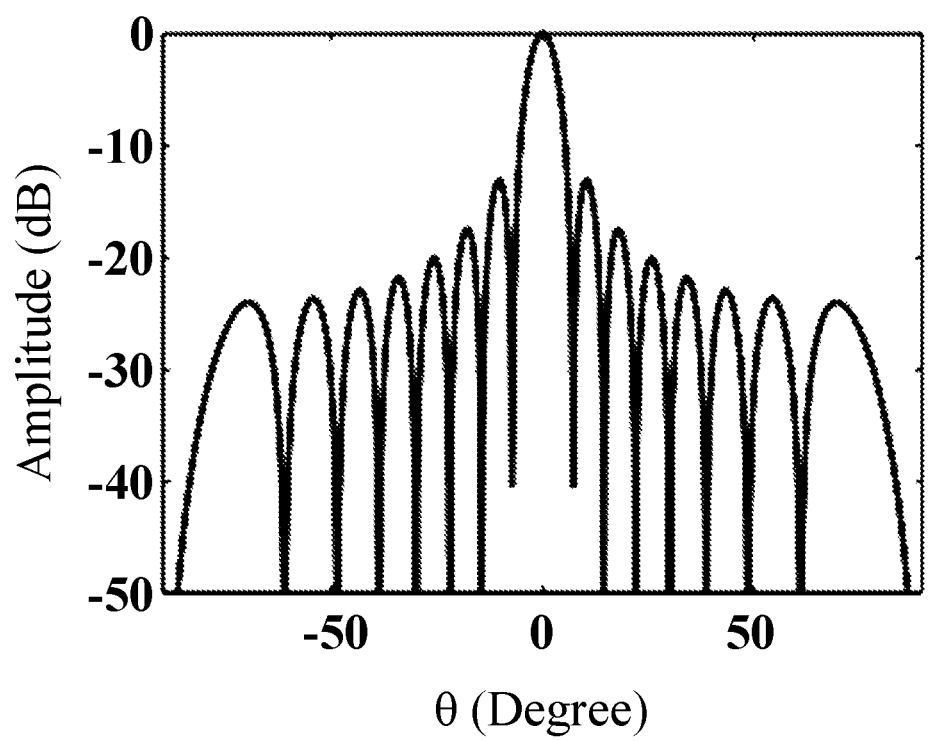
Figure 5C:
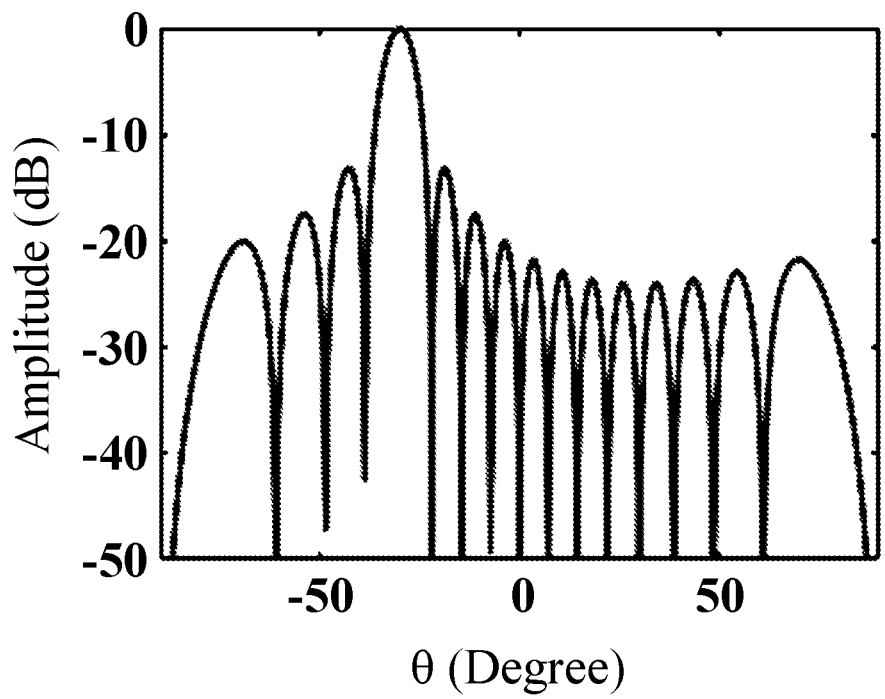

Schematic diagrams of amplitude modulation of a one-dimensional holographic principle of the micro-nano device according to the embodiment of the present disclosure as shown in FIGS. 5A-5C are thereby formed; FIG. 5A is a schematic diagram of an amplitude when one-dimensional beam pointing is θ=30°; FIG. 5B is a schematic diagram of an amplitude when one-dimensional beam pointing is θ=0°; and FIG. 5C is a schematic diagram of an amplitude when one-dimensional beam pointing is θ=−30°.

Figure 6:
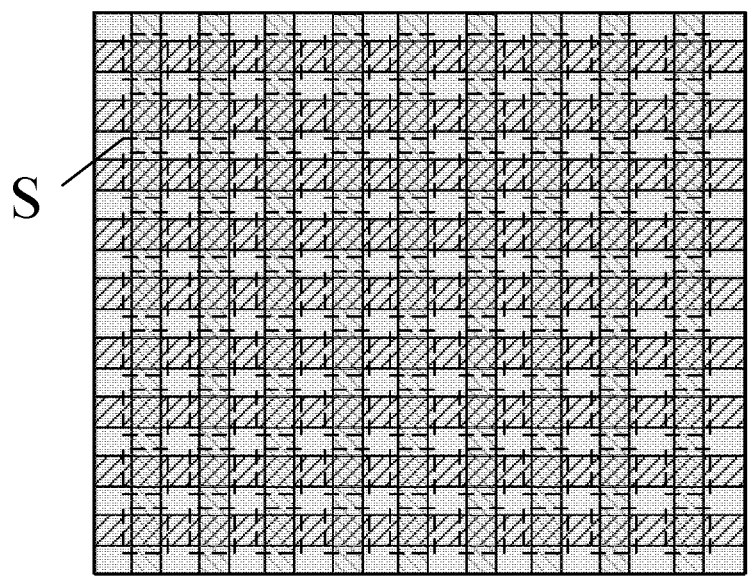
FIG. 6 is a top view of a two-dimensional beam of the micro-nano device according to the embodiment of the present disclosure.
Figure 7:
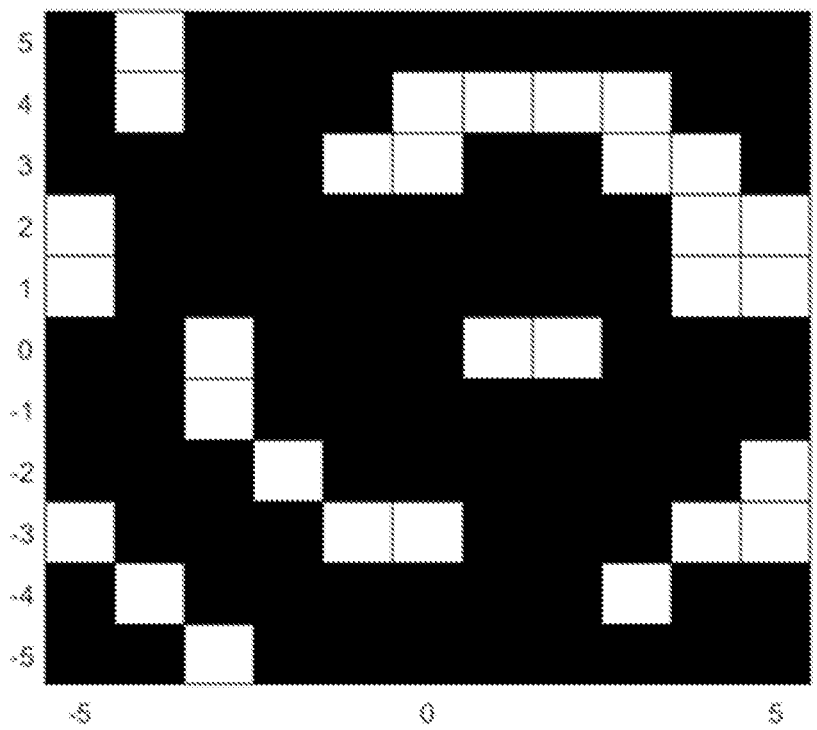
FIG. 7 is a schematic structural diagram of an interference front of a two-dimensional holographic beam of the micro-nano device according to the embodiment of the present disclosure.
Figure 8:
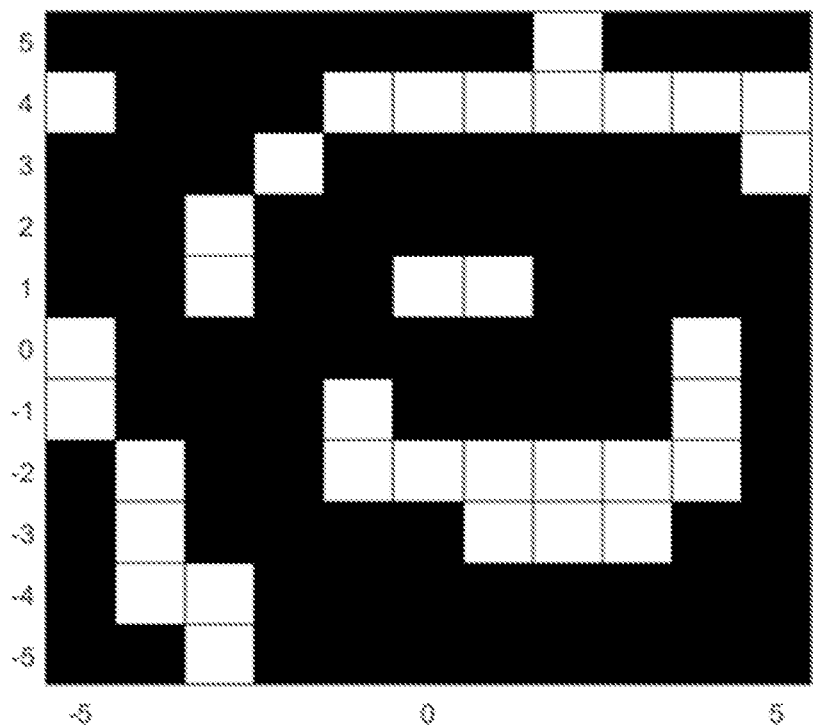
FIG. 8 is a schematic structural diagram of an interference front of a two-dimensional holographic beam of the micro-nano device according to the embodiment of the present disclosure.

As shown in FIGS. 6-8, the dashed boxes in FIG. 6 represent effective areas, one effective area corresponds to one pixel unit, the first electrode layer 2 at the locations of the effective areas is the first electrodes, and the second electrode layer 3 at the locations of the effective areas is the second electrodes. For example, illustrated by a two-dimensional beam, for the two-dimensional beam, it needs to consider a pitch angle, i.e., θ in the following formula; and also needs to consider an azimuth angle, i.e., y in the following formula. A schematic structural diagram of a tunable two-dimensional holographic broadband beam is shown in FIG. 6, the pixel units are composed of 9*9 basic units in FIG. 6, the number of the pixel units is not limited to the number shown in the figure, and the drawing described in the present disclosure is only a schematic structural diagram; and by modulating the period of the pixel unit, a transmittance, i.e., an amplitude, of the pixel unit is controlled. A working principle of a two-dimensional beam of the micro-nano structural cell according to the embodiment of the present disclosure is shown in the following formula:

$$\text{Sample} = |\cos(kx_i \sin\theta \cos\varphi + ky_i \sin\theta \sin\varphi)|;$$

wherein θ is a pitch angle of beam target pointing; y is an azimuth angle of beam target pointing; $x_i$ is a position in the x-axis direction corresponding to each pixel unit, and i is a positive integer; $y_i$ is a position in the y-axis direction corresponding to each pixel unit, and i is a positive integer; $k=2\pi/\lambda$, k being a wave vector in the air; and sample is a sample function.

With the two-dimensional coordinate x and y in the pixel unit as well as the pitch angle θ and the azimuth angle φ, for the specified (θ, φ), the above amplitude sampling is utilized to determine the amplitude value at the position corresponding to the two-dimensional coordinate (x, y), by using a binary method, the amplitude at the corresponding position is compared with a set threshold value, a state greater than the set threshold value is transmission, i.e., '1' in the binary method, a state less than the set threshold value is absorption, i.e., '0' in the binary method, thereby finally achieving tunable broadband beam pointing in the entire space.

With continued reference to FIG. 7, FIG. 7 is a distribution diagram of two states '1' (white) and '0' (black) of an interference front with beam pointing at (30°, 30°). With continued reference to FIG. 8, FIG. 8 is a distribution diagram of two states '1' (white) and '0' (black) of an interference front with beam pointing at (−30°, 30°).

There are a number of options for the tunable dielectric layer 5 in the micro-nano device according to the embodiment of the present disclosure.

In some specific embodiments, the tunable dielectric layer 5 includes a dielectric elastomer, and the thickness of the dielectric elastomer is changed by changing a voltage value between the first electrodes and the second electrodes. The dielectric elastomer is an elastomer material with a high dielectric constant, and its shape or size can be changed under external electrical stimulation; when the external electrical stimulation is withdrawn, the dielectric elastomer returns to its original shape or size, thus generating stress and strain, and converting electrical energy into mechanical energy; for example, a material of the dielectric elastomer includes silicone rubber, an acrylate elastomer, a urethane elastomer, nitrile rubber, vinylidene fluorinated trifluoroethylene, and corresponding composite materials. When a voltage is applied to the first electrode layer 2 and the second electrode layer 3, the dielectric elastomer is thereby compressed so that its thickness becomes thinner, thereby changing the absorption resonance frequency.

In other specific embodiments, a material of the tunable dielectric layer 5 is a phase change material, and the crystalline state of the phase change material is changed by changing a voltage value between the first electrodes and the second electrodes. For example, the phase change material may be GST or VO2, and heat is generated by supplying power to the first electrode layer 2 and the second electrode layer 3 such that the crystalline state, i.e. the dielectric constant, of the phase change material changes, thereby tuning the absorption resonance frequency.

In other specific embodiments, a material of the tunable dielectric layer 5 is a two-dimensional material, and a carrier concentration of the two-dimensional material is changed by changing a voltage value between the first electrodes and the second electrodes. For example, the two-dimensional material is MS2, graphene, or the like; the carrier concentration is changed by supplying power to the first electrode layer 2 and the second electrode layer 3, and thus the energy level is changed, and a refractive index is changed to tune the absorption resonance frequency.

In other specific embodiments, a material of the tunable dielectric layer 5 is a liquid crystal material, and a deflection direction of the liquid crystal material is changed by changing a voltage value between the first electrodes and the second electrodes. Liquid crystal deflection is changed by applying a voltage to the first electrode layer 2 and the second electrode layer 3, achieving a change in refractive index, thereby changing the absorption resonance frequency.

There may be a number of options for the first electrode layer 2 and the second electrode layer 3 as follows.

In some specific embodiments, the first electrode layer 2 and the second electrode layer 3 are both made of indium tin oxide. Since the first electrode layer 2 and the second electrode layer 3 are made of a transparent material, light rays from the pixel units are not absorbed to affect the absorption action of the absorbing layer 6 and the substrate 1 as an absorber.

In other specific embodiments, the first electrode layer 2 is a metal layer and the second electrode layer 3 is a metal layer; and in order to guarantee the light transmission properties of the first electrode layer 2 and the second electrode layer 3, the first electrodes are designed as a mesh structure and the second electrodes are also designed as a mesh structure. For example, a material of the first electrode layer 2 may be copper, aluminum, or the like.

The absorbing layer 6 and the substrate 1 in the micro-nano device according to the embodiment of the present disclosure form an absorber, and particularly a material of the absorbing layer 6 is a metallic material. For example, the material of the absorbing layer 6 is silver.

Figure 9:
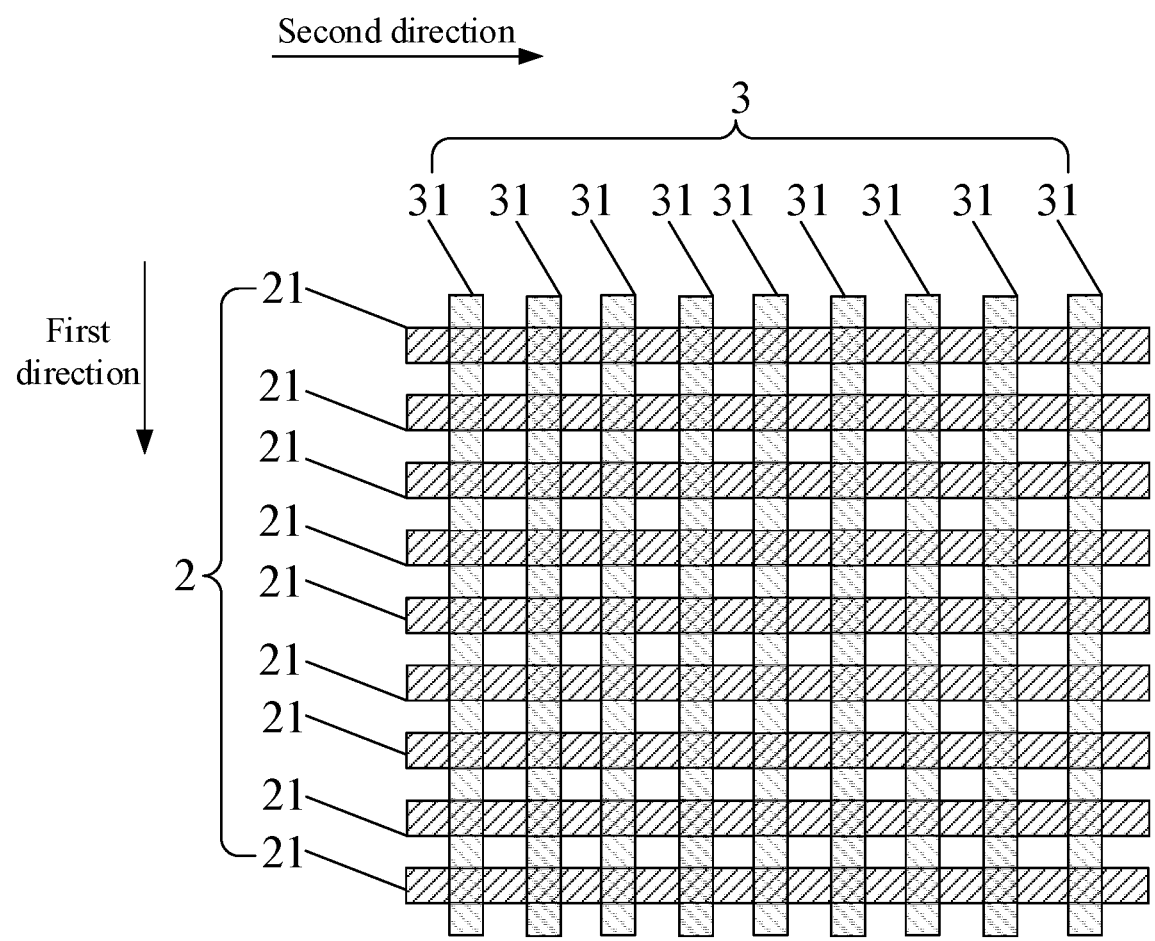
FIG. 9 is a schematic structural diagram of arrangement of a first electrode cell and a second electrode cell according to an embodiment of the present disclosure.

As shown in FIG. 9, the plurality of the first electrodes form a first electrode cell 21, and the plurality of the second electrodes form a second electrode cell 31; the first electrode cell 21 is arranged in a first direction and the second electrode cell 31 is arranged in a second direction, and there are overlapping regions of the first electrode cell 21 and the second electrode cell 31, the overlapping regions being equivalent to the light control regions S. The first electrode cell 21 and the second electrode cell 31 are orthogonal.

In a second aspect, an embodiment of the present disclosure provides a manufacturing method for a micro-nano device, the micro-nano device including a micro-nano structural cell, wherein the method includes the steps of: providing a substrate 1 provided with a light incident surface and a light emergent surface which are oppositely disposed; forming a first electrode layer 2 on the side of the light emergent surface of the substrate 1, wherein the first electrode layer 2 is patterned to form a plurality of first electrodes; forming a second electrode layer 3 on the side, facing away from the substrate 1, of the first electrode layer 2, wherein the second electrode layer 3 is patterned to form a plurality of second electrodes corresponding to the first electrodes, and the plurality of the first electrodes and the plurality of the second electrodes correspond to a plurality of light control regions S; forming a tunable dielectric layer 5 between the first electrode layer 2 and the second electrode layer 3, wherein an absorption resonance frequency of the tunable dielectric layer 5 is changed under the drive of an electric field between the first electrodes and the second electrodes to change a transmission intensity of light in the micro-nano structural cell; and forming an absorbing layer 6 on the side, facing away from the tunable dielectric layer 5, of the second electrode layer 3, wherein the absorbing layer 6 selectively absorbs light in different regions within the plurality of the light control regions S to change the direction of light passing through the micro-nano structural cell.

Figure 10A:
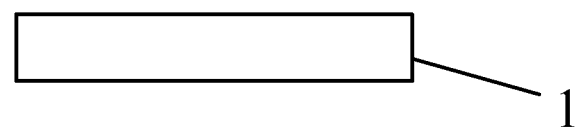
FIGS. 10A-10F are schematic diagrams of manufacturing of film layers of the micro-nano device according to the embodiment of the present disclosure.
Figure 10B:
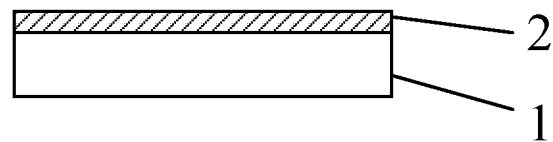
Figure 10C:
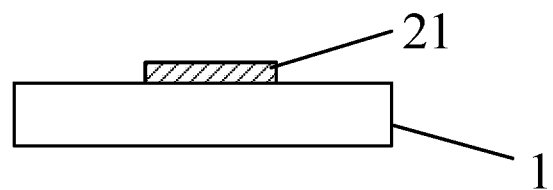
Figure 10D:
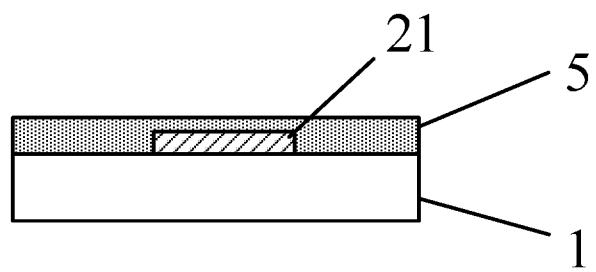
Figure 10E:
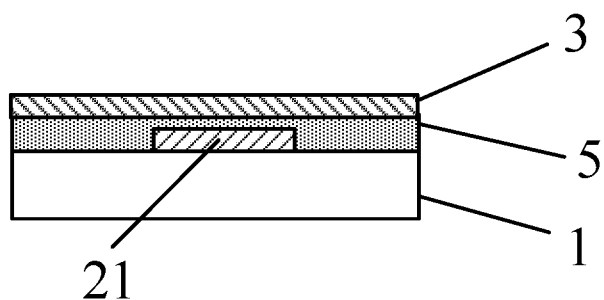
Figure 10F:
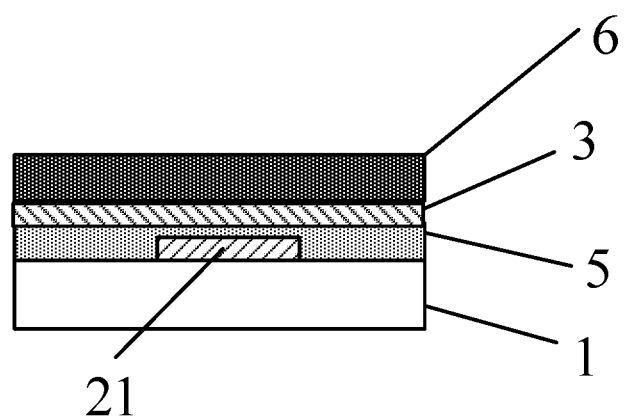

As shown in FIGS. 10A-10F, the substrate 1 is provided as shown in FIG. 10A, for example, a material of the substrate 1 may be glass; with continued reference to FIG. 10B, electron beam evaporation is performed on the substrate 1 to form the first electrode layer 2, and as shown in FIG. 10C, pixelation of second electrodes is achieved by glue spinning, exposure, development and wet etching; then, with reference to FIG. 10D, deposition of the tunable dielectric layer 5 on the surfaces of the first electrodes is achieved by a layer-to-layer nano-self-assembly process, and then, with reference to FIG. 10E, pixelation of the second electrodes is achieved by repeating the step of pixelation of the first electrodes, and finally, with reference to FIG. 10F, the structure of a two-dimensional holographic front is achieved by dot spin coating of silver nanoparticles, dilution, drying in a nitrogen environment, and the like.

In a third aspect, an embodiment of the present disclosure provides a display device, including a display panel, and any one of the micro-nano devices in the first aspect which is located on the side of a light emergent surface of the display panel.

Specifically, the display panel includes a plurality of pixel units, wherein the pixel units are in one-to-one correspondence with first electrodes in the micro-nano device; and the pixel units are in one-to-one correspondence with second electrodes in the micro-nano device.

Obviously, those skilled in the art can make various changes and modifications to the embodiments of the present disclosure without departing from the spirit and scope of the present disclosure. Thus, if these changes and modifications of the present disclosure fall within the scope of the claims of the present disclosure and their equivalents, the present disclosure is also intended to include these changes and modifications.

What is claimed is:

1. A display device, comprising: a display panel, and a micro-nano device located on a side of a light emergent surface of the display panel, wherein the micro-nano device comprises: a micro-nano structural cell; wherein the display panel comprises a plurality of pixel units, wherein the pixel units are in one-to-one correspondence with first electrodes in the micro-nano device, and the pixel units are in one-to-one correspondence with second electrodes in the micro-nano device;

light is emitted from the pixel units to the micro-nano structural cell; and in response to the light being a one-dimensional beam, a working principle of the micro-nano structural cell is shown by a following formula:

$$A_{ref} = e^{-ikz}$$

$$A_{obj} = e^{-ikx_i \sin \theta}$$

$$A = A_{obj} \cdot A^*_{ref,z=0} = A_{obj} = e^{-ikx_i \sin \theta}$$

$$\text{Sample} = \text{Re}(A) = |\cos(kx_i \sin \theta)|$$

wherein $A_{ref}$ is a reference beam; $A_{obj}$ is a target beam; θ is a pitch angle of beam target pointing; z is a height of a z axis; $x_i$ is a position in the x-axis direction corresponding to each pixel unit, and i is a positive integer; k=2π/λ, k being a wave vector in the air; and sample is a sample function; and the micro-nano structural cell comprises:

a substrate provided with a light incident surface and a light emergent surface which are oppositely disposed;

a first electrode layer located on a side of the light emergent surface of the substrate, wherein the first electrode layer comprises the first electrodes;

a second electrode layer located on a side, facing away from the substrate, of the first electrode layer, wherein the second electrode layer comprises the second electrodes disposed in one-to-one correspondence with the first electrodes, the overlapping regions the first electrodes with the second electrodes on the display panel correspondingly form a plurality of light control regions, and the pixel units are located within the light control regions;

a tunable dielectric layer located between the first electrode layer and the second electrode layer; wherein an absorption resonance frequency of the tunable dielectric layer is changed under a drive of an electric field between the first electrodes and the second electrodes to change a transmission intensity of light in the micro-nano structural cell; and an absorbing layer located on aside, facing away from the tunable dielectric layer, of the second electrode layer; wherein the absorbing layer selectively absorbs light in different regions within the plurality of light control regions to change a direction of light passing through the micro-nano structural cell.

2. The display device according to claim 1, wherein the tunable dielectric layer comprises a dielectric elastomer, and a thickness of the dielectric elastomer is changed by changing a voltage value between the first electrodes and the second electrodes.

3. The displayer device according to claim 2, wherein the first electrode layer and the second electrode layer are both made of indium tin oxide.

4. The display device according to claim 2, wherein the first electrode layer is a metal layer and the second electrode layer is a metal layer; and the first electrodes are of a mesh structure and the second electrodes are of a mesh structure.

5. The display device according to claim 1, wherein a material of the tunable dielectric layer is a phase change material, and a crystalline state of the phase change material is changed by changing a voltage value between the first electrodes and the second electrodes.

6. The display device according to claim 5, wherein the first electrode layer and the second electrode layer are both made of indium tin oxide.

7. The display device according to claim 5, wherein the first electrode layer is a metal layer and the second electrode layer is a metal layer; and the first electrodes are of a mesh structure and the second electrodes are of a mesh structure.

8. The display device according to claim 1, wherein a material of the tunable dielectric layer is a two-dimensional material, and a carrier concentration of the two-dimensional material is changed by changing a voltage value between the first electrodes and the second electrodes.

9. The display device according to claim 8, wherein the first electrode layer and the second electrode layer are both made of indium tin oxide.

10. The display device according to claim 1, wherein a material of the tunable dielectric layer is a liquid crystal material, and a deflection direction of the liquid crystal material is changed by changing a voltage value between the first electrodes and the second electrodes.

11. The display device according to claim 10, wherein the first electrode layer and the second electrode layer are both made of indium tin oxide.

12. The display device according to claim 1, wherein the first electrode layer and the second electrode layer are both made of indium tin oxide.

13. The display device according to claim 1, wherein the first electrode layer is a metal layer and the second electrode layer is a metal layer; and the first electrodes are of a mesh structure and the second electrodes are of a mesh structure.

14. The display device according to claim 1, wherein a material of the absorbing layer is a metallic material.

15. The display device according to claim 14, wherein the metallic material is silver.

16. The display device according to claim 1, wherein the first electrodes form a first electrode cell, and the second electrodes form a second electrode cell; and the first electrode cell is arranged in a first direction, the second electrode cell is arranged in a second direction, and the first electrode cell is provided with an overlapping regions with the second electrode cell.

17. The display device according to claim 16, wherein the first electrode cell and the second electrode cell are orthogonal to each other.

* * * * *